Patented May 4, 1937

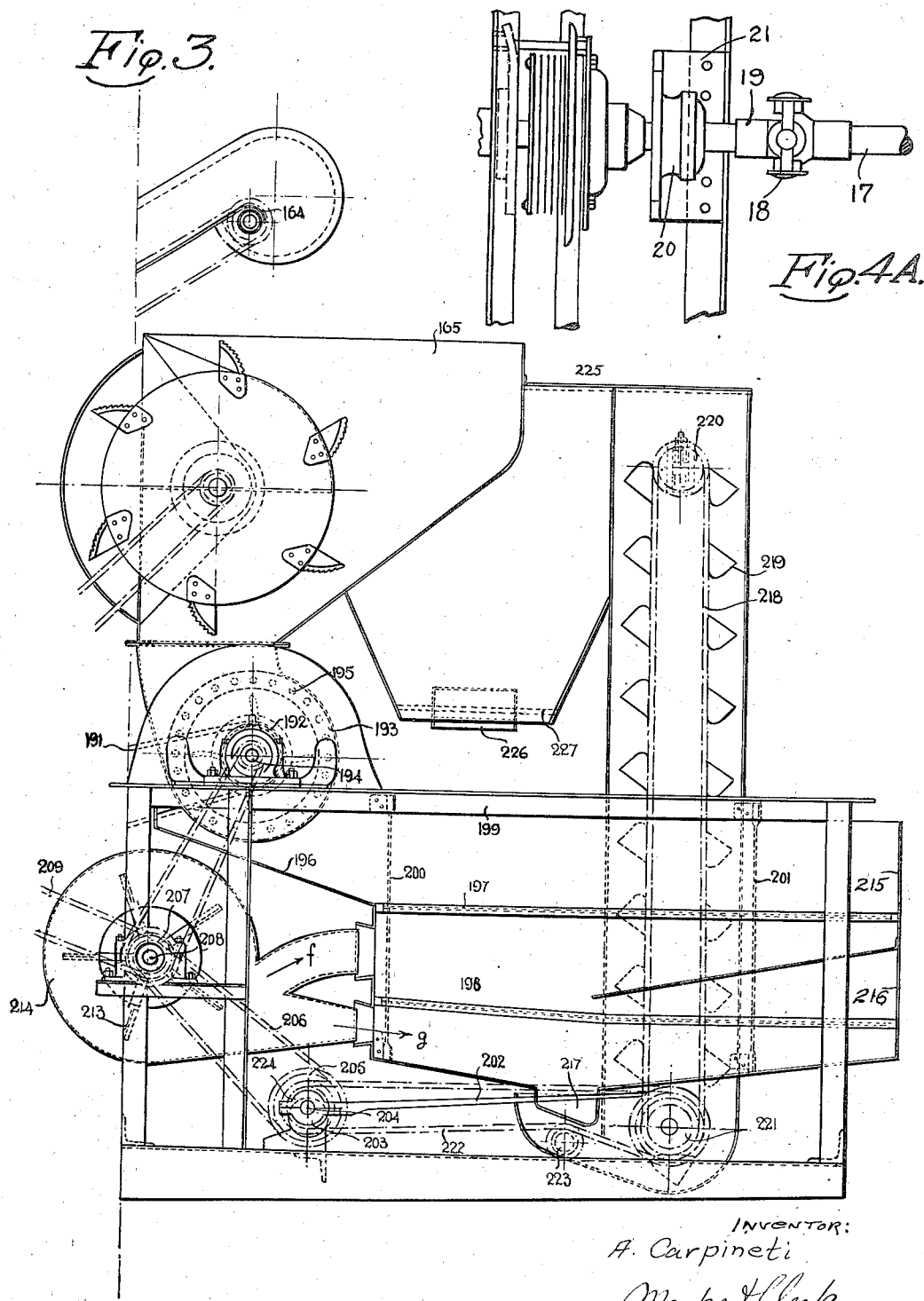

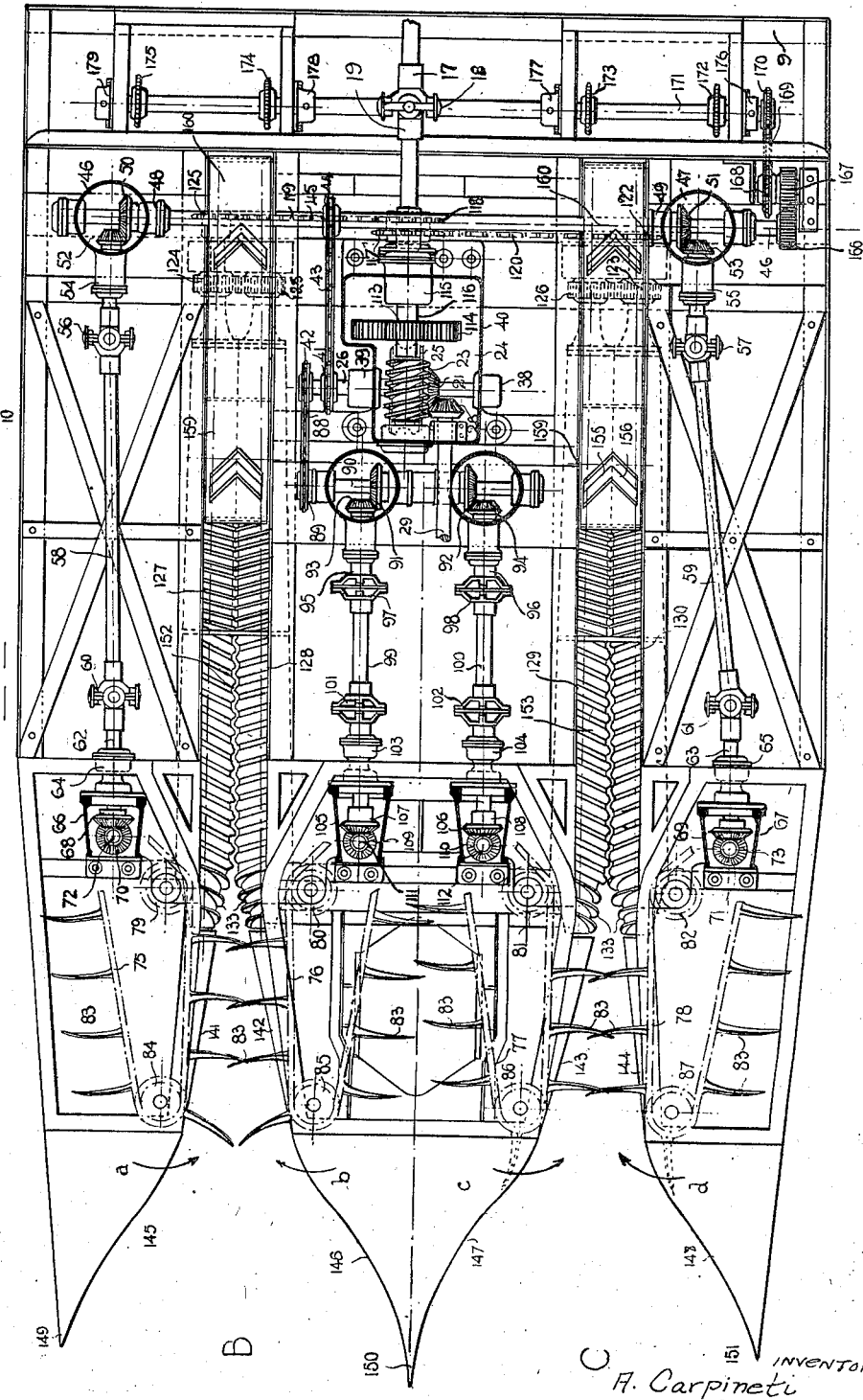

2,079,201

UNITED STATES PATENT OFFICE 2,079,201

MAIZE HARVESTING MACHINE

Arnaldo Carpineti, Buenos Aires, Argentina

Application May 26, 1933, Serial No. 673,052
Renewed September 22, 1936

2 Claims. (Cl. 56—104)

The present invention relates to a corn picking machine, of the type comprising sets of rollers rotating in coincident directions, and of those same rollers which are arranged within the courses corresponding to the rows of corn, and having before them chains provided with prongs projecting towards the interior or axis of said courses, and one of the main features being the position in which the picking rolls are placed.

In previous machines, the picking roller has always been placed in a position oblique to the ground, and whenever it has been arranged parallel to same, it was to take the plant at a considerable distance from the ground. There has been a particular coincidence in the oblique disposition of the roller in all corn picking machines known in the last several years, that is to say, after the application of the explosion motor to the motor vehicles commonly designated as tractors. The only machines, of very old make, wherein the rollers were arranged parallel to the ground (and as stated above, at a considerable distance therefrom) were not exactly corn pickers but tools mounted on two or four wheels, pulled by animals, and in which the rollers were actuated by an operator through the movement of cranks carried by the rollers, to take the ears at the height at which they ordinarily issue from the stalk, and for the purpose of facilitating or complementing hand picking. They were rudimentary tools or machines, of noted inefficiency and mentioned herein for the sole purpose of pointing out that the existence is known of such mechanisms, which bear no similitude in operation or arrangement with the machine which will be hereinafter described.

For the purpose of clearly setting forth the importance of the improvement introduced to the industry by this machine, and also with a view of giving a comparative idea of the value of the main feature of the invention, we will first make a brief reference to the principles that have guided other machines used for the same purpose.

We have already stated that it is a common practice in corn picking machines using rollers, to arrange them in a position obliquely to the ground.

It has always been desired to operate the roller in its foremost end, nearest the birth of the plant, disregarding any other condition than that of attacking the plant which is in vertical or practically vertical position, and with this purpose in view, the prong mechanisms arranged in front of the rollers, have not contributed in a noticeable degree, to cooperate efficiently with said rollers. Said prongs, mounted on endless chains running in a direction opposite to that of the machine and at the sides of the course opening way to the rollers, whether the latter are arranged on a horizontal or oblique plane, do not really establish a continuity contact that might result in a necessary mutual relation.

In the case of the present invention, with the rollers arranged horizontally next to the ground, the sets of prongs mounted on chains in a position in front of the rollers and on an oblique plane in relation to said rollers, are practically removing the same ground and, besides, the prongs serve as a feeder, due to the fact that they operate on a lower plane than that of the mound where the plants are located, and digging at that place their action will reach all the plants, regardless of their position.

The action of the rollers could be compared to that of two worms travelling on top of the mound and having at their end a number of operating prongs forming a curtain introducing in the mound and taking in its travel all the plants, whether they are vertical, inclined or broken down.

In order to appreciate the advantages of the present invention we will refer to the machine illustrated in the accompanying drawings, wherein:

Figure 3 represents the rear section of the machine; and

Figure 4 is a top view of Figure 1.

Figure 4A is a detail view showing a clutch interposed in the transmission between shafts 17 and 22.

Figure 1:
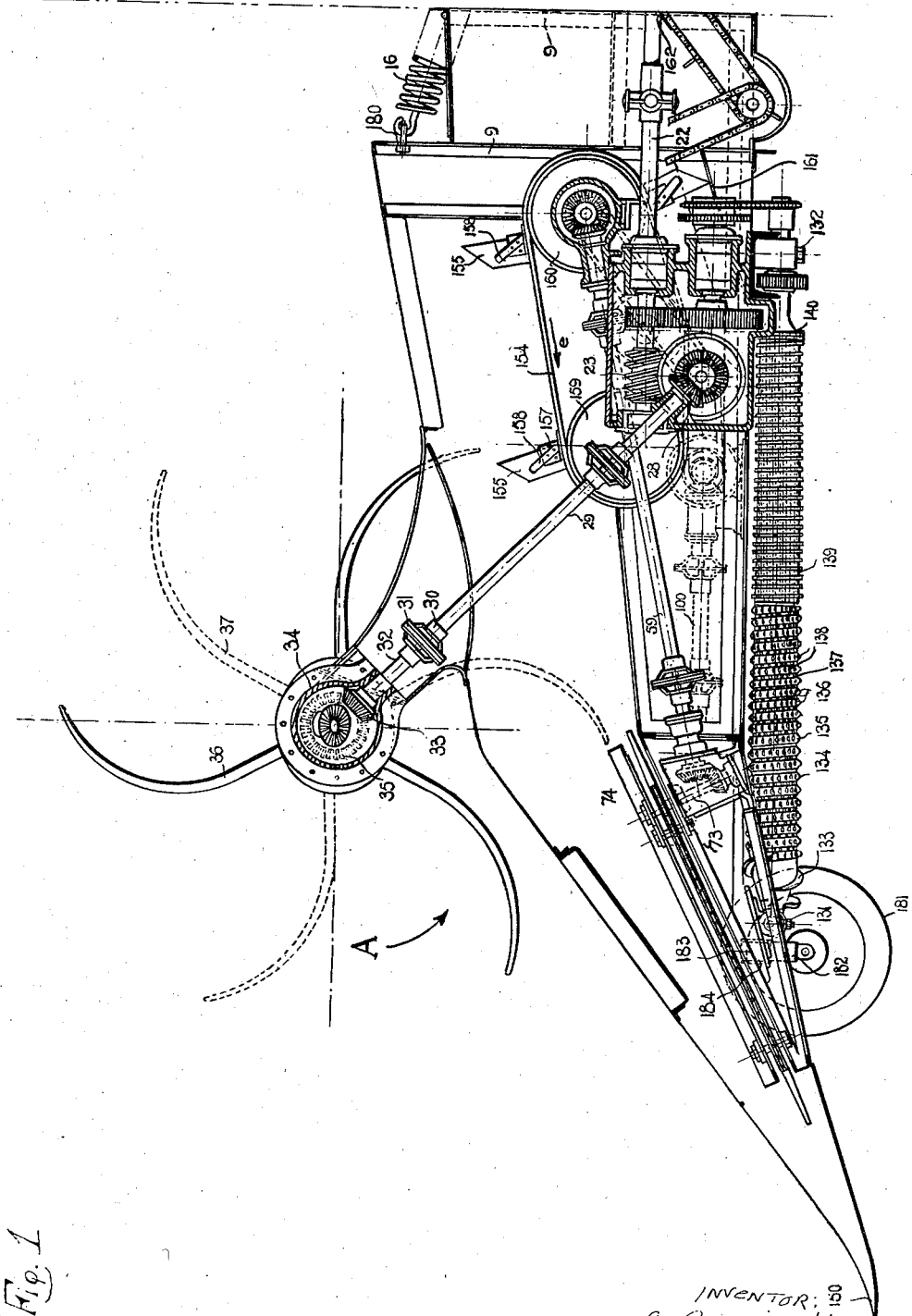
Figure 1 is a side view of the front part of the machine, with the cover removed.
Figure 2:
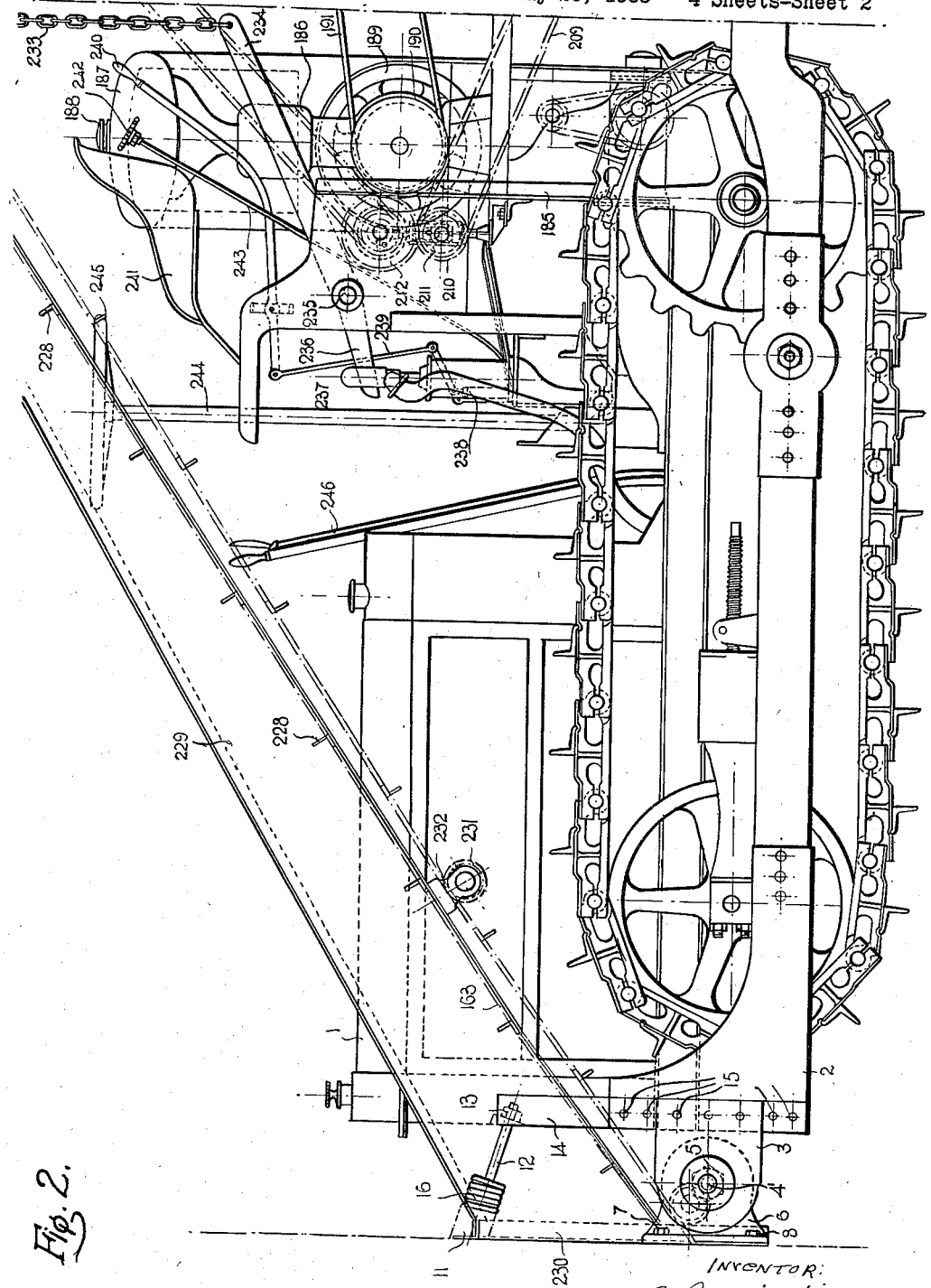
Figure 2 is a side view of the middle part of the machine.

The tractor 1 has a side support 2 where the piece 3 is bolted; this piece 3 has a bolt 4 with corresponding nut 5, adjusting the element 6 which, by means of the bolts 7 and 8, take the upright 9 forming part of the general frame 10. This upright 9 has a crosspiece 11 having turnbuckles 12 bolted at 13 to the upright 14 which is secured by bolts 15. The turnbuckle 12 has a shock absorbing spring 16, which causes the oscillation of the frame 10 on the bolt 4 and the elasticity effect on the spring 16. The frame 10 can change its oscillation or suspension position by merely extending the bolt 12 by means of the nut 13, loosening the bolt 4 until the desired position has been obtained, whereupon the nut 5 is tightened.

The tractor 1 mentioned, corresponds to the type which is common to the industry, to which slight modifications have been made, in order to adapt same to the corn picking machine, the vital part of which is constituted by the front section illustrated in Figures 1 and 4. The rear portion of the machine only includes those elements necessary for the thrashing and bagging of the corn, and forms no part of the present invention. However, it will be understood that apart from the use of the basic means which will be claimed, the object of the machine is constituted by the whole unit or the general disposition of the elements.

The shaft 17 has been coupled to the crank shaft of the tractor motor by means of a detachable joint 18 joining the shaft 19 by means of the bearing 20 which has been secured to the angle 21. The shaft 22 extends to the endless chain 23, enclosed in the sealed gear box 24, which effects the general distribution of power to the different rotating or moving elements of the front part of the machine, and also the elevator conveying the ears to the rear portion.

This endless chain 23 meshes with a crown 25 to rotate the shaft 26 having fixed thereon a bevel gear 27 which, through its corresponding bevel gear 28, rotates the shaft 29; said shaft 29 is interrupted by a cardan 30 of leather 31 wherein the stem 32 operates the bevel gear 33 included in the box 34 and which actuates the bevel gears 35 and the oppositely corresponding, to move the arms 36 and 37 in a rotation of intercepted planes, whereby the arms 36 rotate on one plane while the arms 37 rotate on a plane obliquely to the former, each set of arms entering the dividing course corresponding to each of the inlets "B" and "C" of the machine, in the direction indicated by the arrow "A".

The shaft 26, moved by the crown 25, has bearings 38 and 39 secured to the box 40.

Upon projecting, said shaft 26 receives the gears 41 and 42, the gear 41 moving the chain 43 and, correspondingly, the gear 44 and through same, the shaft 45 leading to the boxes 46 and 47, passing through bearings 48 and 49 to the bevel gears 50 and 51 meshing with the bevel gears 52 and 53 leading, by means of the bearings 54 and 55, to the universal joints 56 and 57 which, through the shafts 58 and 59, reach the other joints 60 and 61, wherefrom the shafts 62 and 63, passing the bearings 64 and 65, reach the boxes 66 and 67 having bevel gears 68 and 69 which through gears 70 and 71 move the shafts 72 and 73 leading to the gears 74 bearing chains 75, 76, 77 and 78, receiving the corresponding deflection by the toothed pulleys 79, 80, 81 and 82. Each of said chains 75 has prongs 83 moving in the direction of the arrows "a", "b", "c" and "d", guided at their front end by the toothed pulleys 84, 85, 86 and 87.

Similarly to the case of the shafts 58 and 59 moved from the boxes 46 and 47 and originally by the gear 41 mounted on shaft 26, the chain 58 acquires its movement from the gears 42 and toothed wheel 89, transmitting said movement to the shaft 90, on which are mounted the bevel gears 91 and 92 and their correspondents 93 and 94 that move the shafts 95 and 96, intercepted by cardans 97 and 98, shafts 99 and 100, further cardans 101 and 102, which through bearings 103 and 104 reach the boxes 105 and 106, within which are the bevel gears 107 and 108 and their correspondents 109 and 110, which, in turn, actuate the shafts 111 and 112, similarly as in the case of the shaft 75, moving the pulley 74 and consequently the chains 76 and 77, guided by the toothed pulleys 80 and 81 and the further ones 85 and 86.

The power of the shaft 22 is taken by the gear 113, communicating to the larger gear 114 arranged in its lower part and passing through box 115 reaches, together with shaft 116 of same, to the toothed wheels 117 and 118 transmitting motion, through chains 119 and 120, to the gears 121 and 122 which, in turn, operate on gears 123 and 124, transmitting the speed of said gears 123 and 124 to gears 125 and 126. Said gears 123, 124, 125 and 126 move each of the rollers 127, 128, 129 and 130 which constitute the corn picking rollers.

The ends of these corn picking rollers have bearings 131 which are repeated on each of the corresponding ends, and serve as friction for same in their forward end, having another bearing 132 in their rear end, which, as in the case of the forward one 131, are repeated on each of the rear supports of said rollers.

These rollers 127, 128, 129 and 130 are divided in different threaded or grooved zones; thus, their forward part has open threads or progressive conical helicoids 133, followed by contact threads 134 on both rollers and having on the top of the threads 135 lenticular depressions 136 and further lenticular depressions 138 on the valleys 137 thereof.

The third grooved zone is constituted by the oblique threads 139 extending to the rear end 140.

The initial grooves are conically conformed following the lines 141, 142, 143 and 144 of the inlets "B" and "C", which in turn are the continuation of lines 145, 146, 147 and 148 of the forward ends 149, 150, and 151.

Belts 154 travel in the interception 152 and 153 of the cylinders and halfways of the grooves 139, said belts being constituted by two pieces of rubber 155 and 156, mounted on a support 157 and kept in respective angular position by the springs 158. Said belts, conveying the pushers just described, rotate in the direction of the arrow "e" and over the pulleys 159 and 160. The pulleys 160 are mounted and fixed on said shaft 45 and act as driving pulleys with respect to the pulleys 159.

The belts 154 just described, with their pushing elements 155, push the ears of corn towards the elevator and over the slope 161, discharging same on the conveyor belt 162, said ears travelling on 163 until they reach the pulley 164 and are discharged into the chute 165.

The power means actuating the two elevator belts, starts also from shaft 46, reaches the gear 166 which communicates with 167 and transmits to the pulley 168, which through belt 169 and pulley 170, moves the shaft 171 on which the toothed circles or rings 172, 173, 174 and 175 are fixed and journalled to bearings 176, 177, 178 and 179.

The position of the forward part corresponding to Figure 1, as indicated before, can be levelled to its operative position according to the bearing point 4 and the regulation of bolt 13, tempered by spring 16, occupying the frame 9 in its upper part 180. This height regulation can be completed by means of the wheel 181 having a tempering element 182 which can be raised or lowered by means of a mechanism contained in box 183, said mechanism consisting of a compression spring and a bolt having several orifices 184 into which the bolt can be arranged, with the consequent modification in the height of the forward part 150.

Arranged on a complementary frame to the frame of tractor 1, there is a frame 185 on which an auxiliary explosion motor 186 has been placed, together with its fuel deposit 187 and fuel charge cover 188. This auxiliary motor has a fly wheel 189 and a transmission pulley 190 which, by means of pulley 191, moves a smaller pulley 192 and a cage 193 mounted on a shaft 194 constituting a known mechanism for corn thrashing machines, said mechanism having bars 195 circularly disposed forming the cage, and as said bars rotate at high speed, they hit the ears until the complete loosening of the grain is obtained. The grain travels down the slope 196 and enters the sieves 197 and 198, suspended on frame 199 by reins 200 and 201 receiving vibratory movement through turnbuckle 202 fixed to the eccentric 203 which in turn is mounted on a shaft 204 having a pulley 205; said pulley, by means of belt 206, is moved from pulley 207 which is mounted on shaft 208, which in turn, by means of belt 209 and pulley 210, receives motive power through gears 211 and 212 moved directly by the pulley 190 coupled to the motor 186.

On the same shaft 208, a fan 213 has been arranged, operating within the cover 214 and moving the air according to the arrows "f" and "g" to expel, through openings 215 and 216, the useless part of the ear, such as the husk and straw. The grain passes down into the bag 217, where an elevator 218 having pockets 219, moved between pulleys 220 and 221, is driven by a belt 222 deflected by pulley 223 and from the drive pulley 224. The grain which has been elevated, falls into the chute 225 where the corn is stored, allowing same to fall down the incline 226 which receives the bags on bars 227, where said bags are held and filled.

The belts 163 elevate the ears, holding same until 164 is reached, by means of crosspieces 228, having wall plates 229, within which said belt 163 travels, forming a box open at its upper part and rigidly secured at its end 230.

On the back part of said box, the pulleys 231, supported by 232, prevent the belt from sagging and interfering with the tractor. The two boxes wherein the belt 163 travels, have chains 233 suspended vertically and fixed by their lower ends to the arms of a lever 234, said arms being fulcrumed at 235, the shorter arm 236 being joined to a pneumatic jack 237. The pump which raises the jack is illustrated in 238 and has a linkage 239 ending in a handle 240 on the side of the control seat 241. When the handle 240 is moved, the jack is elevated and, consequently, the lever arm 236 also rises and the lever arm 234 descends, dragging the chain 233 and, in turn, the boxes 229, compelling the forward section of the machine fulcrumed in 4, to raise and move the forward part 150 away from the ground as far as it is found desirable.

With this mechanism just described, the height of the machine is also regulated, it only being necessary to give a few pumping movements to the jack so as to raise the forward part of the machine, or lower the jack for the weight of the machine to lower same; this takes place by means of a key 242, which through rod 243, opens the jack valve. The shaft 244 and drive 241 have been supplemented with relation to the usual tractor elements, for the purpose of facilitating the operation; the same occurs with the brake lever 246, the balance of the tractor elements remaining in the same unaltered condition as delivered from the factory.

I claim:

1. In a corn picking machine a main driving shaft, chains having prongs thereon for pushing the stalks of corn into the machine, connections with the main driving shaft operating said chains, corn picking rollers arranged in pairs and connections with the main driving shaft rotating the said rollers of each pair in opposite directions, a member at the rear end of said rollers sloping upwardly toward the rear, pulleys driven by the main shaft and an idle pulley located above the line of intersection of each pair of rollers at a substantial distance from the rear end of the rollers, a belt mounted on and driven by said pulleys whereby the ears of corn are carried over said sloping member.

2. In a corn picking machine a main driving shaft, chains having prongs thereon for pushing the stalks of corn into the machine, connections with the main driving shaft operating said chains, corn picking rollers arranged in pairs and connections with the main driving shaft rotating said rolls of each pair in opposite directions, said rollers being divided into differently threaded zones, the forward zone having open helicoidal threads, the next zone having contact threads and the third zone being formed by oblique threads, a member in the rear end of the third zone sloping upwardly toward the rear, pulleys driven by the main shaft and an idle pulley located above the intersection of each pair of rollers and midway of the length of the third zone of said rollers, a belt mounted on and driven by said pulleys, whereby the ears of corn are carried over said sloping member.

ARNALDO CARPINETI.